(12) United States Patent
Cambronero González et al.

(10) Patent No.: US 12,704,158 B2
(45) Date of Patent: Aug. 11, 2026

(54) FREEWHEEL SYSTEM FOR A BICYCLE HUB

(71) Applicant: ORBEA, S. COOP., Mallabia (ES)

(72) Inventors: Juan Carlos Cambronero González, Mallabia (ES); Luís Serrano Fuentes, Mallabia (ES)

(73) Assignee: ORBEA, S. COOP., Mallabia (ES)

( * ) Notice: Subject to any disclaimer, the term of this patent is extended or adjusted under 35 U.S.C. 154(b) by 283 days.

(21) Appl. No.: 18/658,224

(22) Filed: May 8, 2024

(65) Prior Publication Data

US 2024/0376942 A1 Nov. 14, 2024

(30) Foreign Application Priority Data

May 9, 2023 (EP) .................................... 23382431

(51) Int. Cl.
*F16D 41/30* (2006.01)
*B60B 27/02* (2006.01)
*B60B 27/04* (2006.01)

(52) U.S. Cl.
CPC ............ *F16D 41/30* (2013.01); *B60B 27/023* (2013.01); *B60B 27/047* (2013.01)

(58) Field of Classification Search
CPC . F16D 41/30; F16D 41/36; F16D 3/06; B60B 27/023; B60B 27/0031; B60B 27/047
USPC ............................................ 301/6.5; 192/64
See application file for complete search history.

(56) References Cited

U.S. PATENT DOCUMENTS

2008/0006500 A1* 1/2008 Spahr .................. B60B 27/0073 192/64
2015/0202919 A1* 7/2015 Koshiyama ........... B60B 27/023 192/64
2019/0030951 A1* 1/2019 Walthert ............. B60B 27/0031
2019/0032730 A1* 1/2019 Walthert ................. F16D 41/36
2019/0225014 A1* 7/2019 Walthert ................. F16D 41/24

FOREIGN PATENT DOCUMENTS

GB 2059519 A * 4/1981 ............ F16D 41/22

* cited by examiner

*Primary Examiner* — S. Joseph Morano
*Assistant Examiner* — Eva L Comino
(74) *Attorney, Agent, or Firm* — FisherBroyles, LLP; Roger L. Browdy; Ronni S. Jillions

(57) ABSTRACT

A freewheel system for a bicycle hub, comprising an inner ratchet fixed to a hub body and an outer ratchet fixed to a freehub. This system is particular in that an internal surface of the inner ratchet is coupled to an external surface of a connection shell joined to the body, where a diameter of the internal surface of the connection shell is larger than a diameter of a bearing connecting the hub body and the axle. Similarly, also the coupling between the outer ratchet and the freehub can be carried out by the interaction between the internal surface of the outer ratchet and the external surface of the freehub. An inner ratchet and an outer ratchet are also described.

15 Claims, 4 Drawing Sheets

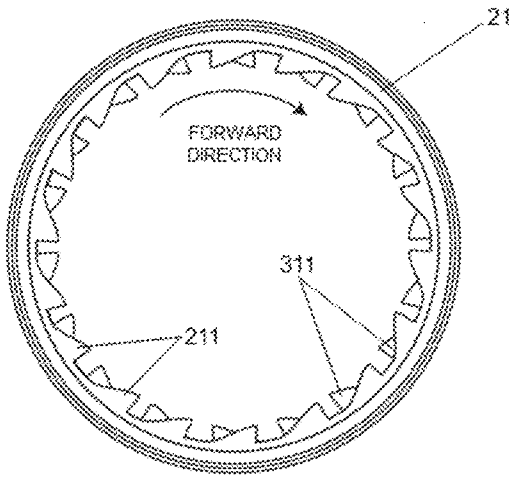
FIG. 6
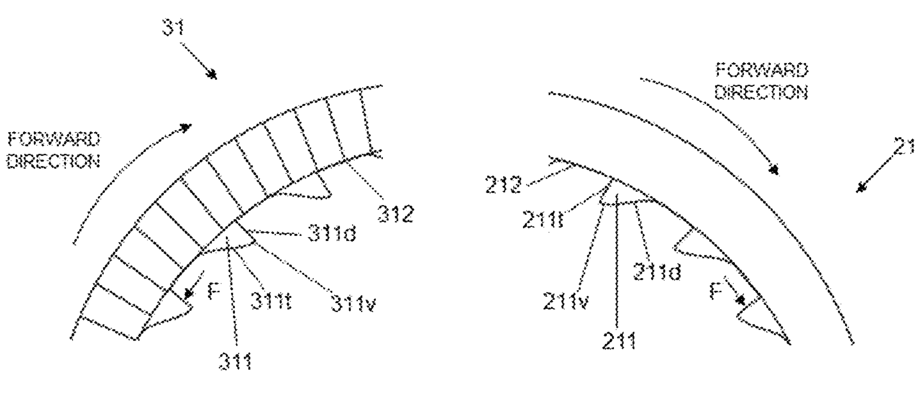
FIG. 7a
FIG. 7b

FREEWHEEL SYSTEM FOR A BICYCLE HUB

FIELD OF THE INVENTION

The present invention belongs to the field of bicycles, and more particularly to the configuration and design of the rear wheel hub of a bicycle.

The object of the present invention is a particularly advantageous freewheel system for the rear wheel hub of a bicycle.

State of the Art

The hub is a fundamental part of the wheel of a bicycle, since it transmits the movement of the pedals to the rear wheel of the bicycle to cause its rotation. Normally, known hubs comprise a hollow cylindrical hub body housing the rotation axle. The brake disks are coupled to an end of the body by means of a coupling mechanism, while a freehub to which the sprockets are fastened is coupled to an opposite end of the body. The components connecting the freehub to the body are designed for achieving a freewheel function, that is, allowing the wheel to keep rotating when pedalling stops. Depending on the internal geometry of the freehub there are mainly two types of hubs: pawl hubs and ratchet hubs.

FIGS. 1 and 2 show the configuration of an exemplary ratchet hub. As shown, the hub (110) comprises a hollow hub body (111) housing the bicycle axle (E) supported by two bearings ($R_{C1}$, $R_{C2}$). In turn, the end of the axle (E) located to the right in the illustration of FIG. 1 is coupled to the inner rings of two other bearings ($R_{N1}$, $R_{N2}$), the outer rings of said bearings ($R_{N1}$, $R_{N2}$) being coupled to the freehub (122). In this context, it is important to understand that the wheel is rigidly fixed to the body (111) and the freehub (122) is rigidly fixed to the sprockets, which are naturally rotated by the pedals. That is, the body (111) rotates continuously when the bicycle moves, while the freehub (122) only rotates when the user is pedalling irrespectively of whether the bicycle is moving or not. To enable the movements of the body (111) and the freehub (122) to be uncoupled, a number of components referred to as "freewheel system" is provided between them. The most important components making up the freewheel system are the outer ratchet (121) and the inner ratchet (131).

Note that, in the present document, the terms "inner" and "outer" are interpreted in connection to the distance of the component in question to the plane of symmetry of the bicycle in the direction of the axis of rotation of the hub. Thus, an "inner component" is a component that is close to said plane, while an "outer component" is a component located farther from said plane.

On the other hand, the terms "internal" and "external" as used in this document are interpreted in connection to the distance from the component to the axis of rotation of the hub. Therefore, an "internal component" is a component that is close to said axis, while an "external component" is a component located farther from said axis.

Note also that the expression "forward direction" refers in the present document to the rotation direction of the body, and therefore of the wheel, during normal operation of the bicycle. To determine the forward direction in the example illustrated in the present figures, the position of the freehub supporting the sprockets, normally at the right side of the axle according to the natural displacement direction of the bicycle, has been taken into account.

Finally, the terms "forward" and "rear" used in this document are interpreted according to the displacement direction, unless the context clearly indicates otherwise.

The outer ratchet (121) has a radial external toothing formed by teeth (1211) having an essentially trapezoidal shape. In turn, although not shown in the figures, the cylindrical wall of the inner cavity of the freehub (122) has trapezoidal slots having a shape that is complementary to that of said teeth (1211) of the outer ratchet (121). The outer ratchet (121) is therefore fastened to said internal cavity of the freehub (122) by fitting the radial external teeth (1211) into the trapezoidal slots of the internal cavity of the freehub (122). Both components are thereby fastened and therefore rotate together.

On the other hand, the inner ratchet (131) has an external radial toothing also formed by teeth (1311) having an essentially trapezoidal shape. In turn, a shell (134) for connection with the body (111) has an internal cavity having trapezoidal slots having a shape that is complementary to that of said teeth (1311) of the inner ratchet (131). This connection shell (134) further has an external thread configured to be coupled to an internal cavity of the body (111). In this manner, the outer ratchet (131) can be rigidly fastened to the body (111).

In addition to the described components, the outer ratchet (121) and the inner ratchet (131) further have additional toothings provided on mutually opposing faces thereof.

Specifically, the outer ratchet (121) has, in an inner face thereof, teeth (1213) tangentially inclined in a direction opposite the forward direction. That is, each of these teeth (1213) mainly comprises a flat wall essentially perpendicular to the inner face of the outer ratchet (121) followed by an also essentially flat wall having a downward tangential inclination towards said inner face in a direction opposite the forward direction.

On the other hand, the inner ratchet (131) has, on an outer face, teeth (1313) tangentially inclined in the forward direction. That is, these teeth (1313) are similar to the teeth (1213) of the outer ratchet (121), although they are inclined tangentially in the opposite direction.

Finally, the freewheel system in this particular example further comprises a pair of springs (123, 133) designed to abut respectively against a cavity in the outer face of the outer ratchet (121) and against a cavity of the inner face of the inner ratchet (131). When the hub (110) is completely mounted, these springs (123, 133) push the outer (121) and inner (131) ratchets one towards the other. Thereby, when the outer ratchet (121) rotates with respect to the inner ratchet (131) in the forward direction, the teeth (1213) of the inner face of the outer ratchet (121) engage the teeth (1313) of the outer face of the inner ratchet (131), and therefore the outer ratchet (121) causes the inner ratchet (131) to move. Since the inner ratchet (131) is fixed to the body (111) by means of the connection shell (134) disclosed above, the ultimate effect is that the rotation torque from pedalling is applied to the wheel. On the contrary, when the outer ratchet (121) rotates with respect to the inner ratchet (131) in a direction opposite the forward direction, the teeth (1213) on the inner face of the outer ratchet (121) slide without engaging the teeth (1313) on the outer face of the inner ratchet (131), and therefore the outer ratchet (121) rotates freely without moving the inner ratchet (131).

Therefore, this ratchet hub works as follows. Pedalling by the cyclist causes, by means of the sprockets, the freehub (122) to rotate in the forward direction. Since the outer ratchet (121) is fastened to the freehub (122) by means of the external radial teeth (1211) having a trapezoidal shape being coupled into the complementary trapezoidal slots of the inner cavity of the freehub (122), the outer ratchet (121) also rotates together with the freehub (122). When the rotation speed of the outer ratchet (121) in the forward direction reaches the rotation speed of the inner ratchet (131) caused by the movement of the bicycle, the toothing on the inner face of the outer ratchet (121) engages the toothing on the outer face of the inner ratchet (131), and the pedalling torque is transmitted to the wheels. On the contrary, when the rotation speed of the outer ratchet (121) in the forward direction is lower than the rotation speed of the inner ratchet (131) caused by the movement of the bicycle, said toothings slide one over the other and, therefore, no pedalling torque is transmitted to the wheels.

This hub configuration is disclosed in greater detail in U.S. Pat. No. 7,562,755B2 of 2006 in the name of the originally Swiss company DT SWISS INC.

BRIEF DESCRIPTION OF THE INVENTION

The inventors of the present invention have developed an improved freewheel system that increases the useful life and performance of the hub. This new freewheel system is based on increasing the diameter of at least the inner ratchet, more preferably of both the inner ratchet and the outer ratchet. Increasing the diameter of the inner ratchet entails that connection to the hub body takes place through its internal face instead of, as conventionally, through its external face. This diameter increase is advantageous in that the bearing of the hub body closest to the freehub can be displaced outwards, farther from the plane of the bicycle, thereby increasing stability and durability of the hub.

First Aspect: Freewheel System

A first aspect of the present invention is directed to a freewheel system for the hub of a bicycle comprising an inner ratchet connected to a body and an outer ratchet connected to a freehub.

An inner face of the outer ratchet comprises a toothing formed by teeth inclined in the tangential direction in a direction opposite the forward direction. In turn, an outer face of the inner ratchet comprises a toothing formed by teeth inclined in the tangential direction in the forward direction. Thanks to this configuration, the inner ratchet and the outer ratchet are coupled one to the other such that, when the freehub tends to rotate with respect to the hub body in the forward direction, the toothing of the inner face of the outer ratchet couples the toothing of the outer face of the inner ratchet, the inner ratchet thereby being moved by the outer ratchet. On the contrary, when the freehub rotates with respect to the hub body in a direction opposite the forward direction, the toothing of the inner face of the outer ratchet remains uncoupled from the toothing of the outer face of the inner ratchet, the outer ratchet thereby rotating freely without moving the inner ratchet.

The elements disclosed until now are generally known from the state of the art in this type of systems. However, the freewheel system of the present invention differs from the state of the art in that the connection between the inner ratchet and the body takes place through an internal surface of said inner ratchet (instead of through an external surface, as conventional until now).

Specifically, the inner surface of the inner ratchet is coupled to an outer surface of a connection shell moving with the body. The connection shell moving with the body can be part of the body, such that both make up a single part.

Alternatively, the connection shell could be a separate connection part provided with means configured for connection to the hub body, for example by threading or the like. In any case, the main feature in this context is that the connection shell is rigidly connected to the body such that both rotate together.

Furthermore, a diameter of an internal surface of the connection shell is larger than a diameter of one of the bearings connecting the body with the axle. Naturally, this implies that the diameter of the inner ratchet is also larger than the diameter of the bearings connecting body and axle. Thanks to this configuration, it is possible to "move" the bearings outwards, that is, farther from the plane of the bicycle in the direction of the axis of rotation of the hub, such that said bearing can be provided in the plane of the inner ratchet or in an ever farther position with respect to the plane of the bicycle. Separating the bearing from the plane of the bicycle provides the body, and therefore the hub as a whole, with greater stability and durability.

On the other hand, the connection between the body and the outer ring of the bearing can also be implemented in a number of manners. For example, when the connection shell is a separate part fixed to the body, it could have an internal diameter sufficiently larger than the diameter of the outer ring of the bearing, such that the bearing could pass through said connection shell and be fixed to a suitable portion of the body. However, in a particularly preferred embodiment of the invention where the connection shell is an integral part of the body, the internal surface of the connection shell is coupled directly to an outer ring of the bearing. This coupling can be carried out in any suitable manner such as e.g. by pressure.

As to the coupling between the inner ratchet and the connection shell, it can also be carried out in any manner that is suitably firm and secure. For example, the inner ratchet could have a thread on its internal surface allowing for threading on a complementary thread of the external surface of the connection shell. However, in a particularly preferred embodiment of the invention, this coupling between the inner ratchet and the connection shell is carried out by means of an internal radial toothing comprising teeth that protrude radially inwards from the internal surface of the inner ratchet and engaging complementary radial cavities of the external surface of the connection shell.

In principle, the teeth of the internal radial toothing of the inner ratchet can have any shape, such as e.g. the conventional pyramidal shape. However, according to a particularly preferred embodiment of the invention, said teeth have an asymmetric shape where the front edge comprises a wall that is essentially perpendicular to the internal cylindrical surface of the inner ratchet and the rear edge comprises a descending ramp inclined rearwards with respect to said internal cylindrical surface. In this context, the terms "forward" and "rearward" used herein are interpreted with respect to the forward direction.

Note that it is not necessary for the wall making up the forward edge to be completely flat, it could have a small curvature provided its direction is approximately radial. Similarly, the descending ramp making up the rear edge need not necessarily have a constant inclination angle throughout its whole length, but it could also have a certain curvature depending on the needs of each application.

This shape of the teeth is particularly advantageous because it is more resistant to deformation caused by the forces they are subjected to during use of the bicycle. Indeed, the force acting on the teeth has an essentially tangential direction opposite the forward direction. It is the force exerted by the inner ratchet to the connection shell when the user pedals and the external ratchet moves the inner ratchet that, in turn, transmits said rotation torque to the body. More specifically, this force is exerted by the forward edge of the teeth provided on the internal surface of the inner ratchet on the slots provided on the external surface of the connection shell where said teeth engage. The new shape of the teeth provides a forward edge that is essentially perpendicular to the direction of said force and, at the same time, a rear edge providing additional support for better withstanding tensions in the material caused by said force. In short, the new shape of the teeth is particularly designed to minimize the deformations caused by continued use.

Naturally, the slots in the external surface of the connection shell have the same shape as the teeth, since the latter fit into the former. Therefore, all the explanations in connection to the shape of the teeth of the cylindrical internal surface of the inner ratchet are also applicable to the shape of the slots of the external surface of the connection shell, unless the context clearly indicates otherwise.

Although the teeth of the internal cylindrical surface of the inner ratchet of the present invention may simply have a triangular shape, preferred embodiments of the present invention describe smoothed shapes that are particularly advantageous mainly because wear is reduced and fitting of the teeth in the corresponding slots is facilitated.

According to a preferred embodiment of the invention, the ramp of the rear edge of each tooth of the internal radial toothing of the inner ratchet comprises a concave forward length followed by a convex rear length smoothly joining the internal cylindrical surface of the inner ratchet. Furthermore, each tooth of the internal radial toothing of the inner ratchet comprises a rounded corner smoothly joining the rear edge and the front edge. Also, a corner joining the forward edge of each tooth of the internal radial toothing of the inner ratchet and the internal cylindrical surface of the inner ratchet can also be rounded. Thanks to these smoothed forms, the shape of the teeth ultimately resembles a “shark fin”.

In principle, most of the advantages of the present invention are obtained only by configuring the inner ratchet as disclosed above. This, as mentioned earlier, allows for generating a space around the axle of the bicycle that can be used for providing the bearing connecting said axle with the body in a position farther away from the plane of the bicycle, thus improving the stability and durability of the assembly.

However, it is particularly advantageous to also configure the outer ratchet in a similar manner as the inner ratchet, that is, substantially increasing its diameter with respect to the conventional diameter of this type of parts. Therefore, according to another preferred embodiment of the invention, an internal surface of the outer ratchet is coupled to an external surface of an inner portion of the freehub. The inner portion of the freehub is the end of the freehub closest to the plane of the bicycle. This coupling could be carried out in a number of manners, e.g. by threading or the like, although preferably it is implemented by means of an internal radial toothing comprising teeth protruding radially inwards from the inner surface of the outer ratchet and engaging radial complementary slots in the external surface of the inner portion of the freehub.

Further, in a similar manner to the inner ratchet, the teeth of the internal radial toothing of the outer ratchet may have an asymmetrical shape where the rear edge comprises a wall that is essentially perpendicular to an internal cylindrical surface of the inner ratchet and the forward edge comprises a descending ramp inclined forward with respect to said internal cylindrical surface.

Also in a similar manner as disclosed above with respect to the shape of the slots in the external surface of the connection shell, in this case the shape of the slots in the external surface of the inner portion of the freehub is the same as the shape of the internal radial teeth of the outer ratchet. Therefore, all the explanations regarding the shape of the teeth of the internal surface of the outer ratchet are also applicable to the shape of the slots in the external surface of the inner portion of the freehub, unless the context clearly indicates otherwise.

The shape of the teeth of the internal surface of the outer ratchet can also have the smoothed areas disclosed in connection to the teeth of the inner ratchet and for the same reasons. Therefore, according to a preferred embodiment of the invention, the ramp of the forward edge of each tooth of the radial internal toothing of the outer ratchet comprises a rear concave length followed by a forward convex length smoothly joining the internal cylindrical surface of the outer ratchet. Further, each tooth of the radial internal toothing of the outer ratchet may have a rounded corner smoothly joining the rear edge and the forward edge. Also a corner connecting the rear edge of each tooth of the radial internal toothing of the outer ratchet and the cylindrical internal surface of the outer ratchet can be smoothed.

The present invention is also directed to a bicycle comprising a freewheel system as disclosed in the above paragraphs.

Second Aspect: Inner Ratchet

A second aspect of the present invention is directed to an inner ratchet for a freewheel system of a bicycle hub. The inner ratchet comprises:

- A toothing provided on an external face formed by teeth inclined in a tangential direction in the forward direction.
- A radial internal toothing comprising teeth protruding radially inwards from the internal surface of the inner ratchet.

Third Aspect: Outer Ratchet

A third aspect of the present invention is directed to an outer ratchet for a freewheel system of a bicycle hub. The outer ratchet comprises:

- A toothing provided on an internal face formed by teeth inclined in a tangential direction in the direction opposite the forward direction.
- An internal radial toothing comprising teeth that protrude radially inwards from the internal surface of the outer ratchet.

BRIEF DESCRIPTION OF THE FIGURES

The details of the invention are shown in the attached drawings, which do not limit the scope of the invention:

FIG. 6 shows a view in a longitudinal direction of the inner and outer ratchets of a freewheel system according to the present invention.

FIGS. 7*a* and 7*b* shows detailed views respectively of an inner ratchet and an outer ratchet of a freewheel system according to the present invention.

DETAILED DESCRIPTION OF THE INVENTION

A particular exemplary freewheel system (1) for a bicycle hub (10) according to the present invention with reference to FIGS. 3-7 is now disclosed.

Figure 1:
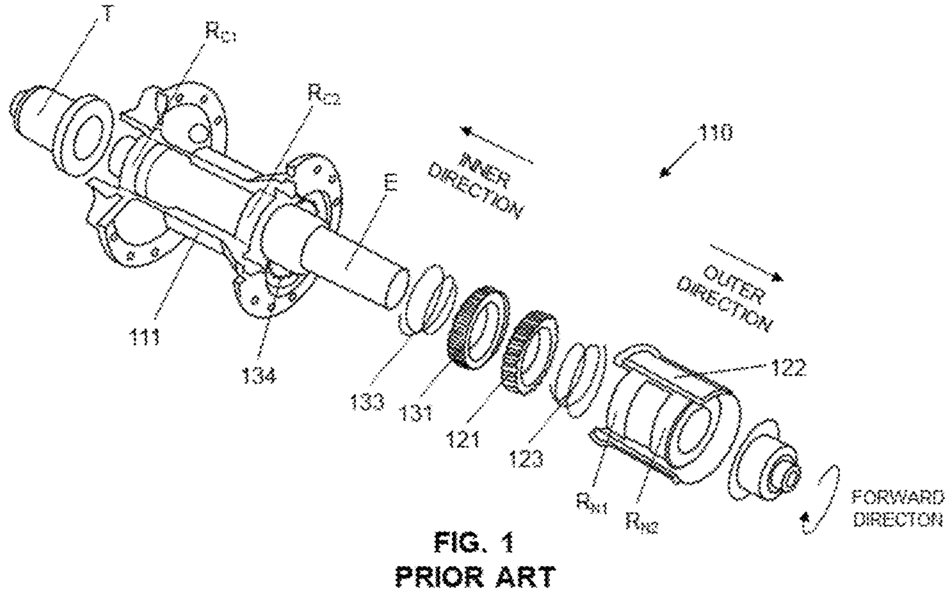
FIG. 1 shows a perspective view of a rear hub of a bicycle according to the prior art.
Figure 2:
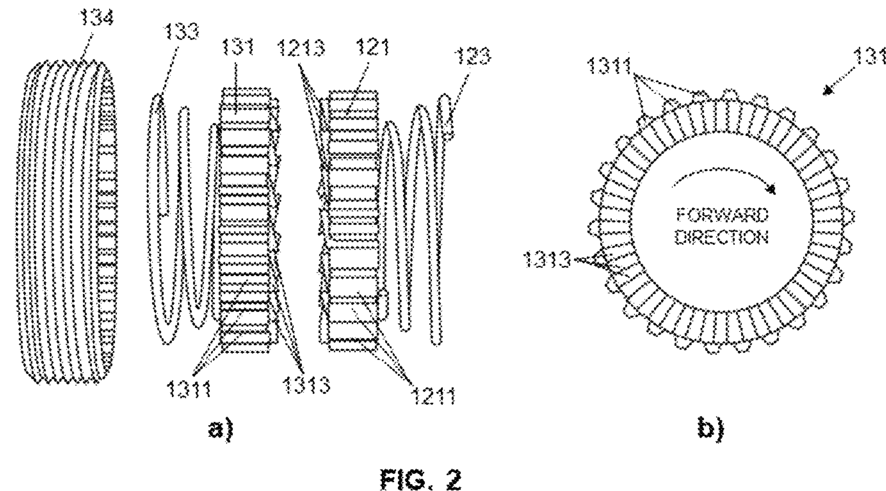
FIGS. 2*a* and 2*b* respectively show a lateral view of a freewheel system according to the prior art and a detailed view of an inner ratchet corresponding to this configuration.
Figure 3:
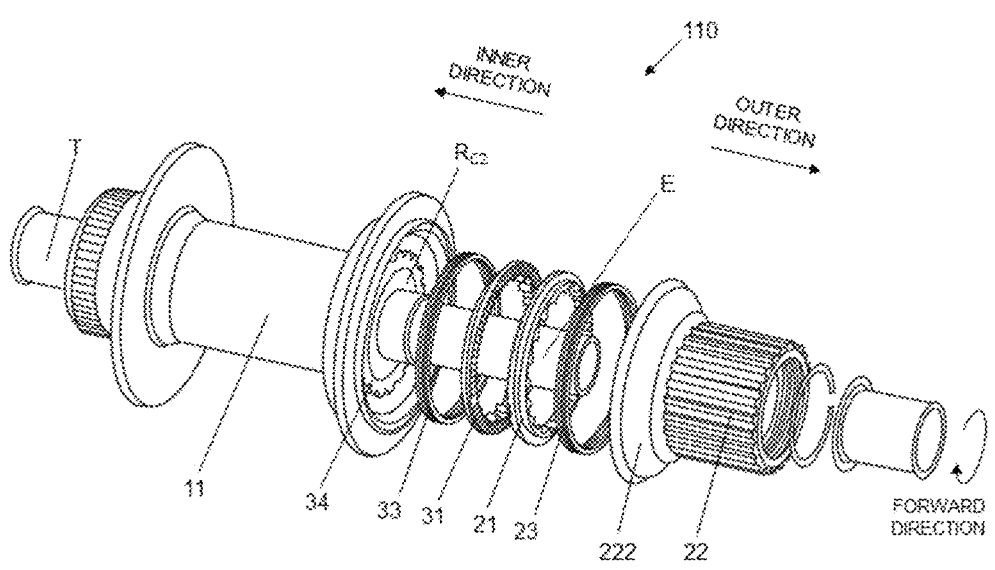
FIG. 3 shows a perspective view of a freewheel system according to the present invention.
Figure 4:
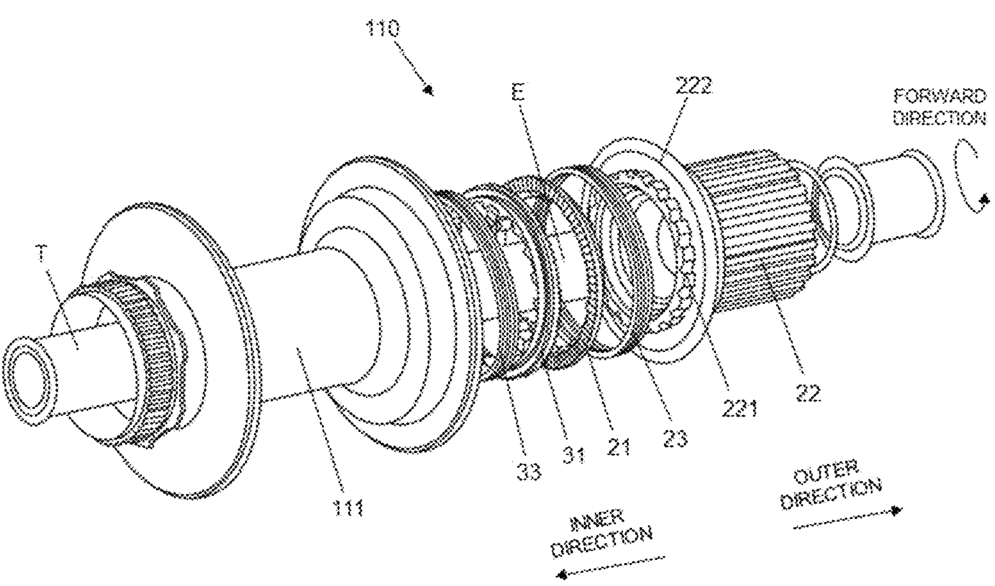
FIG. 4 shows another perspective view of a freewheel system according to the present invention.

FIGS. 3 and 4 show an exemplary hub (10) according to the present invention where the component elements thereof are shown. A body (11) is fixed to the axle (E) by means of bearings ($R_{C1}$, $R_{C2}$). The left end of the axle (E) in the figure is covered by a cap (T) fastened to the body (11). On the other hand, the right end of the axle (E) is coupled, by means of another pair of bearings ($R_{N1}$, $R_{N2}$), to a freehub (22).

The freewheel system (1) of the present example comprises an outer ratchet (21) and an inner ratchet (31) respectively fixed to the freehub (22) and the body (11). The outer and inner ratchets (21, 31) are configured to interact one with the other with the purpose of achieving the known "freewheel" effect disclosed earlier in the present document.

Figure 5:
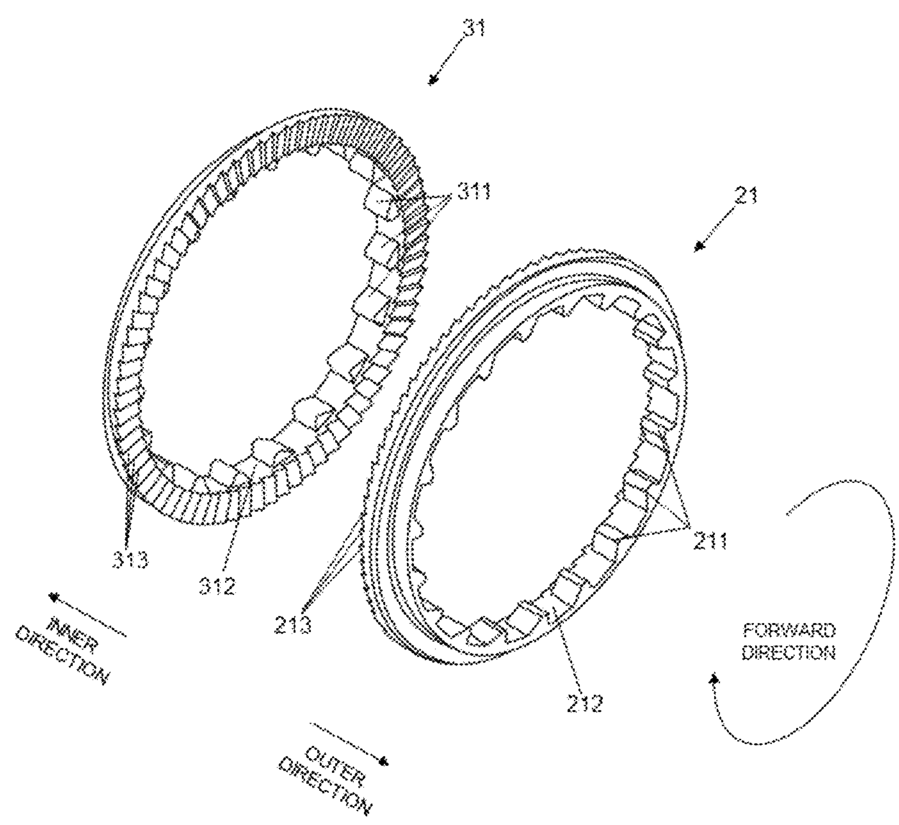
FIG. 5 shows a perspective view of the inner and outer ratchets of a freewheel system according to the present invention.

Thereto, like the conventional ratchets, an inner face of the outer ratchet (21) in this example has a toothing formed by teeth (213) tangentially inclined in a direction opposite the forward direction. These teeth (213) are shown in FIG. 5, each of them comprising a forward wall that is perpendicular to the inner face of the ratchet (21) and a rear wall inclined in a descending direction towards the inner face of the ratchet (21) in a direction opposite the forward direction.

Similarly, the inner ratchet (31) also has a toothing on an outer face that is formed by teeth (313) inclined tangentially in the forward direction. These teeth (313), shown in greater detail in FIG. 5, are shown by a rear wall that is perpendicular to the outer face of the ratchet (31) and a forward wall that is inclined in a descending direction towards the outer face in the forward direction.

The freewheel system (1) of this example further comprises two springs (23, 33) respectively designed to abut against an inner face of the inner ratchet (31) and an outer face of the outer ratchet (21) such that, when the unit is assembled, they push the inner ratchet (31) and the outer ratchet (21) one towards the other. Consequently, as disclosed in greater detail earlier in the present document, when the outer ratchet (21) reaches the speed of the inner ratchet (31) in the forward direction, the walls of the teeth (213, 313) oriented in perpendicular to the outer face and the inner face of the respective inner (31) and outer (21) ratchet engage each other, causing the outer ratchet (21) to drag the inner ratchet (31). On the contrary, if the speed of the inner ratchet (31) is greater than the speed of the outer ratchet (21) in the forward direction, the inclined walls of the respective teeth (213, 313) slide ones against the others without engagement, and the outer ratchet (21) rotates freely without dragging the inner ratchet (31).

Therefore, the operation of the freewheel system (1) of this example is practically the same as the prior art systems. The difference making up the essence of the present invention is the manner in which the inner ratchet (31) is fixed to the body (11) and, in the option disclosed in the present example, also the mode in which the outer ratchet (21) is fixed to the freehub (22).

The inner ratchet (31) has an internal radial toothing formed by a plurality of teeth (311) protruding radially from an internal surface (312) of said inner ratchet (31). In turn, the body (11) has a connection shell (34) having a cylindrical inner surface having complementary slots with respect to the teeth (311) of the internal surface (312) of the inner ratchet (31), as shown in FIG. 3. In this context, note that the connection shell (34) shown in this example is an integral part of the body (11) itself. In any case, the inner ratchet (31) is fixed to the connection shell (34) by fitting the teeth (311) of the radial internal toothing of the inner ratchet (31) into the slots of the external cylindrical surface of the connection shell (34). In turn, as shown in FIG. 3, in this example the connection shell (34) is fixed to the outer ring of bearing ($R_{C2}$). This connection can be carried out in any suitable manner, for example, by pressure by means of the conventional method of heating one of the two parts for causing dilatation.

This configuration is advantageous in that the diameter of the inner ratchet (31) can be substantially increased, thereby allowing the bearing ($R_{C2}$) connecting the body (11) to the axle (E) to be positioned farther away from the plane of the bicycle in comparison with the conventional systems. This outwards displacement of the bearing ($R_{C2}$) increases the stability and durability of the assembly. In this context, note that even with the increased diameter, the inner ratchet (31) is housed within a cavity of the body (11) when the hub (10) is completely assembled.

The shape of the teeth (311) of the inner ratchet (31) in this example is similar to a shark fin, and it includes a forward edge (311*d*) formed by a wall that is essentially perpendicular to the internal cylindrical surface (312) of the inner ratchet (31), and a rear edge (311*t*) formed by a ramp that descends towards the internal cylindrical surface (312) of the inner ratchet (31) in a direction opposite the forward direction. The descending ramp has a forward concave length followed by a rear convex length smoothly joning the inner surface (312) of the inner ratchet (31). The connection between the wall making up the forward edge (311*d*) and the ramp making up the rear edge (311*t*) is rounded to form the rounded corner (311*v*), as well as the connection between the wall making up the forward edge (311*d*) and the internal surface (312) of the inner ratchet (31). The shape of the internal radial teeth (311) of the inner ratchet (31) is shown in greater detail in FIG. 7*a*.

In the example disclosed in this document, also the outer ratchet (21) has an inner radial toothing formed by a plurality of teeth (211) protruding radially from an internal cylindrical surface (212) of said outer ratchet (21). In turn, an external Surface of the inner portion (211) of the freehub (22) has slots having a shape that is complementary to that of the teeth (211) of the outer ratchet (21), as shown in FIG. 4. In this context, the inner portion (221) of the freehub (22) makes reference to an inner end of the freehub (22), that is, the end of the freehub (22) closest to the plane of the bicycle. Thanks to this configuration, the outer ratchet (21) is fixed to the freehub (22) by fitting the teeth (211) of the internal cylindrical surface (212) of said outer ratchet (21) inside the external cylindrical surface of the inner portion (221) of the freehub (22).

This configuration of the outer ratchet (21) is advantageous because, in a similar manner as the inner ratchet (31), it allows for increasing the diameter to provide more space in an area near the axle (E), such that bearing ($R_{N1}$) can be displaced. Since the dimensions of the remaining elements of the hub (10), and particularly the freehub (22), remain unchanged, the outer ratchet (31) is now placed outside the external cylindrical surface of the freehub (22). Thereto, the freehub (22) is provided with a protection edge (222) covering the space intended to house the outer ratchet (31). When the hub (10) is fully mounted, this protection edge (222) abuts against an external surface of the body (11), such that the outer ratchet (31) is protected from the environment.

Finally, just as the internal radial teeth (311) of the inner ratchet (31), the internal radial teeth (211) of the outer ratchet (21) of this example have a shape similar to that of a shark fin. This means that each tooth has a rear edge (211*t*) formed by a wall that is essentially perpendicular to the internal cylindrical surface (212) of the inner ratchet (21), and a forward edge (211*d*) formed by a ramp that descends towards the internal cylindrical surface (212) in the forward direction. More specifically, the descending ramp has a concave rear length followed by a forward convex length smoothly joining an internal surface (212) of the outer ratchet (21). The connection between the wall making up the rear edge (211*t*) and the ramp making up the forward edge (211*d*) is rounded to form a rounded corner (211*v*), just as the connection between the wall making up the rear edge (211*t*) and the internal surface (212) of the outer ratchet (21). The shape of the internal radial teeth (211) of the outer ratchet (21) is shown in detail in FIG. 7*b*.

The invention claimed is:

1. Freewheel system for a bicycle hub, comprising an inner ratchet fixed to a hub body and an outer ratchet fixed to a freehub, where an inner face of the outer ratchet comprises a toothing formed by teeth that are tangentially inclined in a direction opposite the forward direction, and an outer face of the inner ratchet comprises a toothing formed by teeth that are tangentially inclined in the forward direction, where the outer ratchet and the inner ratchet are coupled one to the other such that, when the freehub tends to rotate with respect to the body in the forward direction, the toothing on the inner face of the outer ratchet engages the toothing on the outer face of the inner ratchet, the inner ratchet being dragged by the outer ratchet while, when the freehub rotates with respect to the body in a direction opposite the forward direction, the toothing on the inner face of the outer ratchet remains disengaged from the toothing of the outer face of the inner ratchet, the outer ratchet rotating freely without dragging the inner ratchet, wherein an internal surface of the inner ratchet is coupled to an external surface of a connection shell moving together with the body, where a diameter of an internal surface of the connection shell is larger than a diameter of a bearing connecting the body with the axle.

2. Freewheel system according to claim 1 where, the internal surface of the connection shell is coupled to an outer ring of the bearing).

3. Freewheel system according to claim 2, where the coupling between the internal surface of the connection shell and the outer ring of the bearing is a pressure coupling.

4. Freewheel system according to claim 1, where the coupling between the inner ratchet and the connection shell takes place by means of an internal radial toothing comprising teeth protruding radially inwards from the internal surface of the inner ratchet and fitting into complementary radial slots of the external surface of the connection shell.

5. Freewheel system according to claim 4, where the teeth of the radial internal toothing of the inner ratchet have an asymmetric shape where the front edge comprises a wall that is essentially perpendicular to a cylindrical internal surface of the inner ratchet and the rear edge comprises a descending ramp inclined rearwards with respect to said internal cylindrical surface.

6. Freewheel system according to claim 5, where the ramp of the rear edge of each tooth of the internal radial toothing of the inner ratchet comprises a concave front length followed by a rear convex length that smoothly joins the internal cylindrical surface of the inner ratchet.

7. Freewheel system according to claim 6, where each tooth of the internal radial toothing of the inner ratchet further comprises a rounded corner smoothly joining the rear edge and the front edge.

8. Freewheel system according to claim 5, where each tooth of the internal radial toothing of the inner ratchet further comprises a rounded corner smoothly joining the rear edge and the front edge.

9. Freewheel system according to claim 1, where an internal surface of the outer ratchet is coupled to an external surface of an inner portion of the freehub.

10. Freewheel system according to claim 9, where the coupling between the outer ratchet and the freehub is carried out by means of an internal radial toothing comprising teeth that protrude radially inwards from the internal surface of the outer ratchet and fitting into complementary radial slots of the external surface of the inner portion of the freehub.

11. Freewheel system according to claim 10, where the teeth of the internal radial toothing of the outer ratchet have an asymmetric shape where the rear edge comprises a wall that is essentially perpendicular to an internal cylindrical surface of the outer ratchet and the front edge comprises a descending ramp inclined forward with respect to said internal cylindrical surface.

12. Freewheel system according to claim 11, where the ramp of the front edge of each tooth of the internal radial toothing of the outer ratchet comprises a rear concave length followed by a front convex length smoothly joining the internal cylindrical surface of the outer ratchet.

13. Freewheel system according to claim 12, where each tooth of the internal radial toothing of the outer ratchet further comprises a rounded corner smoothly joining the rear edge and the front edge.

14. Freewheel system according to claim 11, where each tooth of the internal radial toothing of the outer ratchet further comprises a rounded corner smoothly joining the rear edge and the front edge.

15. Bicycle comprising a freewheel system according to claim 1.

* * * * *